(12) United States Patent
Chaudhri et al.

(10) Patent No.: US 10,162,478 B2
(45) Date of Patent: Dec. 25, 2018

(54) DELAY OF DISPLAY EVENT BASED ON USER GAZE

(71) Applicant: Apple Inc., Cupertino, CA (US)

(72) Inventors: Imran Chaudhri, San Francisco, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/878,983

(22) Filed: Oct. 8, 2015

(65) Prior Publication Data

US 2016/0034141 A1    Feb. 4, 2016

Related U.S. Application Data

(63) Continuation of application No. 13/604,462, filed on Sep. 5, 2012, now Pat. No. 9,189,064.

(51) Int. Cl.
*G06F 3/0481* (2013.01)
*G06F 3/01* (2006.01)
*G06F 9/451* (2018.01)

(52) U.S. Cl.
CPC .......... *G06F 3/04817* (2013.01); *G06F 3/013* (2013.01); *G06F 3/0481* (2013.01); *G06F 9/451* (2018.02)

(58) Field of Classification Search
CPC .. G06F 9/4443; G06F 3/04817; G06F 3/0481; G06F 3/013; G06F 3/011; G06F 3/012; G06F 3/015

(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| EP | 0 816 982 | 1/1998 |
| JP | 2000-163031 A | 6/2000 |

(Continued)

OTHER PUBLICATIONS

Final Office Action dated Jan. 23, 2015, for U.S. Appl. No. 13/604,462, filed Sep. 5, 2012, nine pages.

(Continued)

*Primary Examiner* — Vinh T Lam
(74) *Attorney, Agent, or Firm* — Morrison and Foerster LLP

(57) ABSTRACT

Methods and systems of delaying the execution of a display event based on a detected user gaze are provided. Display events may be generated and executed to change a user interface of a display. For example, an autocorrect algorithm can automatically replace a typed word with a corrected word in a text field, generating a display event that causes the corrected word to be displayed instead of the typed word. Such a display event may be executed as soon as possible after its generation. However, a gaze detection device can obtain information that indicates a user is not looking at the typed word on the display. In such a situation, it may be more intuitive to delay the execution of the display event until the gaze information indicates that the user is looking at the typed word.

21 Claims, 11 Drawing Sheets

(58) Field of Classification Search
USPC .................. 345/156, 157–158, 173–174
See application file for complete search history.

(56) References Cited

U.S. PATENT DOCUMENTS

| | | | |
|---|---|---|---|
| 5,731,805 | A | 3/1998 | Tognazzini et al. |
| 5,825,352 | A | 10/1998 | Bisset et al. |
| 5,831,594 | A | 11/1998 | Tognazzini et al. |
| 5,835,079 | A | 11/1998 | Shieh |
| 5,880,411 | A | 3/1999 | Gillespie et al. |
| 5,886,683 | A | 3/1999 | Tognazzini et al. |
| 5,898,423 | A | 4/1999 | Tognazzini et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,437,758 | B1 | 8/2002 | Nielsen et al. |
| 6,690,387 | B2 | 2/2004 | Zimmerman et al. |
| 7,015,894 | B2 | 3/2006 | Morohoshi |
| 7,030,863 | B2 * | 4/2006 | Longe ............... G06F 3/0237 345/172 |
| 7,184,064 | B2 | 2/2007 | Zimmerman et al. |
| 7,429,108 | B2 | 9/2008 | Rosenberg |
| 7,663,607 | B2 | 2/2010 | Hotelling et al. |
| 8,479,122 | B2 | 7/2013 | Hotelling et al. |
| 9,189,064 | B2 | 11/2015 | Chaudhri et al. |
| 2004/0156020 | A1 * | 8/2004 | Edwards ............ G06F 3/013 351/209 |
| 2006/0197753 | A1 | 9/2006 | Hotelling |
| 2008/0211766 | A1 | 9/2008 | Westerman et al. |
| 2011/0202843 | A1 | 8/2011 | Morris |
| 2012/0131519 | A1 * | 5/2012 | Jitkoff ............... G06F 3/0481 715/863 |
| 2013/0050432 | A1 | 2/2013 | Perez et al. |
| 2013/0145304 | A1 * | 6/2013 | DeLuca ............. G06F 3/013 715/781 |
| 2013/0300654 | A1 * | 11/2013 | Seki ................. G06F 3/013 345/156 |
| 2014/0062853 | A1 | 3/2014 | Chaudhri |
| 2014/0334666 | A1 * | 11/2014 | Lankford ............ G06F 3/013 382/103 |

FOREIGN PATENT DOCUMENTS

| | | |
|---|---|---|
| JP | 2002-342033 A | 11/2002 |
| WO | WO-2011/100436 A1 | 8/2011 |
| WO | WO-2014/039449 A1 | 3/2014 |

OTHER PUBLICATIONS

International Search Report dated Dec. 6, 2013, for PCT Application No. PCT/US2013/057875, filed Sep. 3, 2013, five pages.

Lee, S.K. et al. (Apr. 1985). "A Multi-Touch Three Dimensional Touch-Sensitive Tablet," *Proceedings of CHI: ACM Conference on Human Factors in Computing Systems,* pp. 21-25.

Non-Final Office Action dated Jun. 20, 2014, for U.S. Appl. No. 13/604,462, filed Sep. 5, 2012, eleven pages.

Notice of Allowance dated Jul. 8, 2015, for U.S. Appl. No. 13/604,462, filed Sep. 5, 2012, seven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

DELAY OF DISPLAY EVENT BASED ON USER GAZE

CROSS REFERENCE TO RELATED APPLICATIONS

This application is a continuation of U.S. patent application Ser. No. 13/604,462 (now U.S. Publication No. 2014/0062853), filed Sep. 5, 2012, the entire disclosure of which is incorporated herein by reference for all purposes.

FIELD OF THE DISCLOSURE

This relates generally to executing user interface events based on user gaze detection.

BACKGROUND OF THE DISCLOSURE

An electronic device can include a display that displays content intended to be viewed by a user. The content can change based on changing context. For example, when an instant message is received by the electronic device, a pop-up notification can be displayed indicating to the user that a new message has been received. However, if the user is not looking at the portion of the display with the pop-up notification, or not looking at the display at all, the user may miss the notification altogether.

SUMMARY OF THE DISCLOSURE

This relates to delaying the execution of a display event based on a detected user gaze. Display events may be generated and executed to change a user interface of a display. For example, an autocorrect algorithm can automatically replace a typed word with a corrected word in a text field, generating a display event that causes the corrected word to be displayed instead of the typed word. Such a display event may be executed as soon as possible after its generation. However, a gaze detection device can obtain information that indicates a user is not looking at the typed word on the display. For example, the user may be looking at a keyboard. In such a situation, it may be more intuitive to delay the execution of the display event until the gaze information indicates that the user is looking at the typed word.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Various examples relate to delaying the execution of a display event based on a detected user gaze. Display events may be generated and executed to change a user interface of a display. For example, an autocorrect algorithm can automatically replace a typed word with a corrected word in a text field, generating a display event that causes the corrected word to be displayed instead of the typed word. Such a display event may be executed as soon as possible after its generation. However, a gaze detection device can obtain information that indicates a user is not looking at the typed word on the display. For example, the user may be looking at a keyboard. In such a situation, it may be more intuitive to delay the execution of the display event until the gaze information indicates that the user is looking at the typed word.

Although examples disclosed herein may be described and illustrated herein primarily in terms of display events, it should be understood that the examples are not so limited, but are additionally applicable to events of electronic devices in general, whether or not the events are related to a display. For example, non-display events can include sending data from one module to another, modifying or processing stored data, initiating or ending a process, and the like.

Figure 1A:
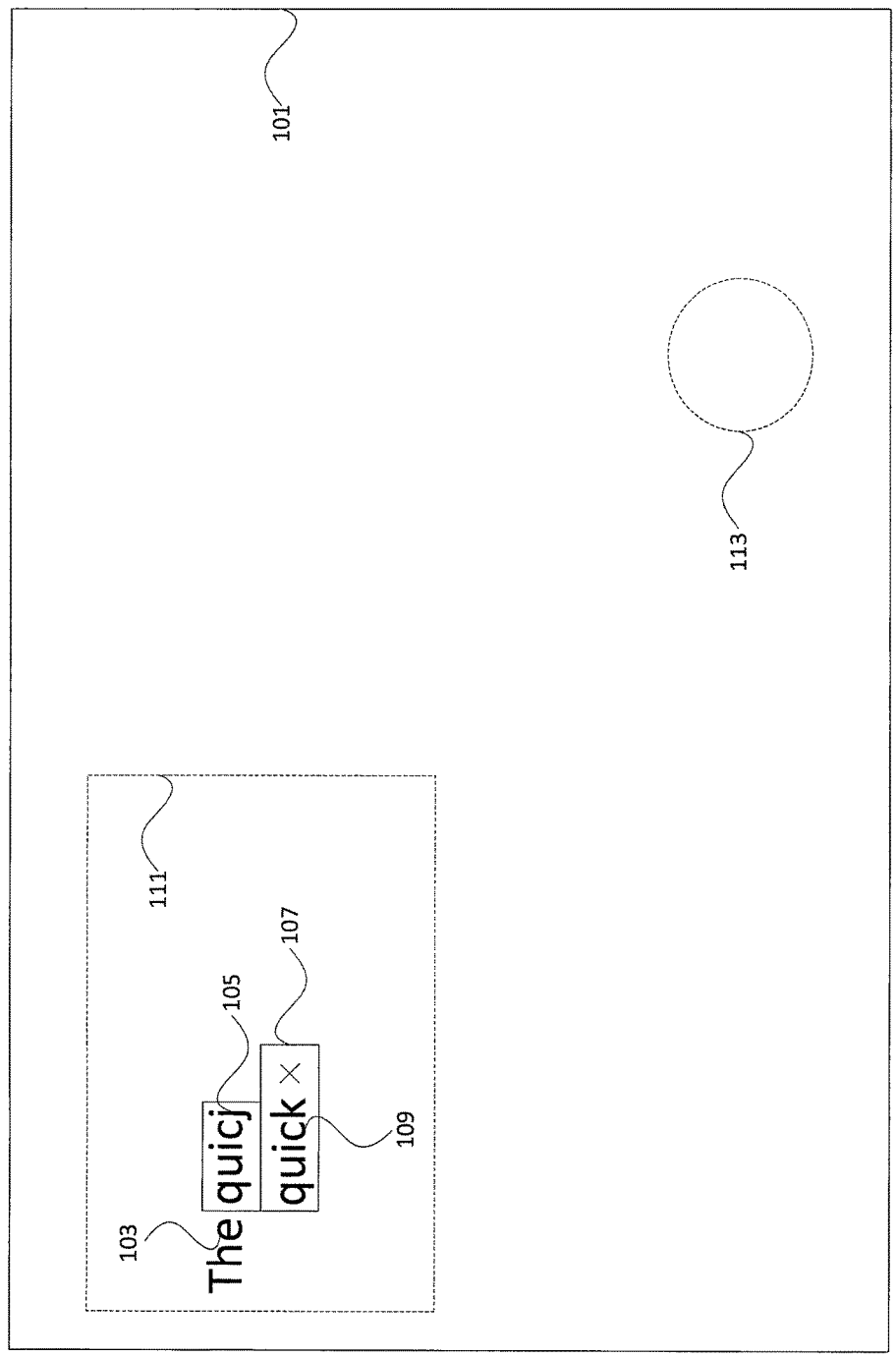
FIG. 1A illustrates a gaze region outside a target region associated with a display event according to examples of the disclosure.
Figure 1B:
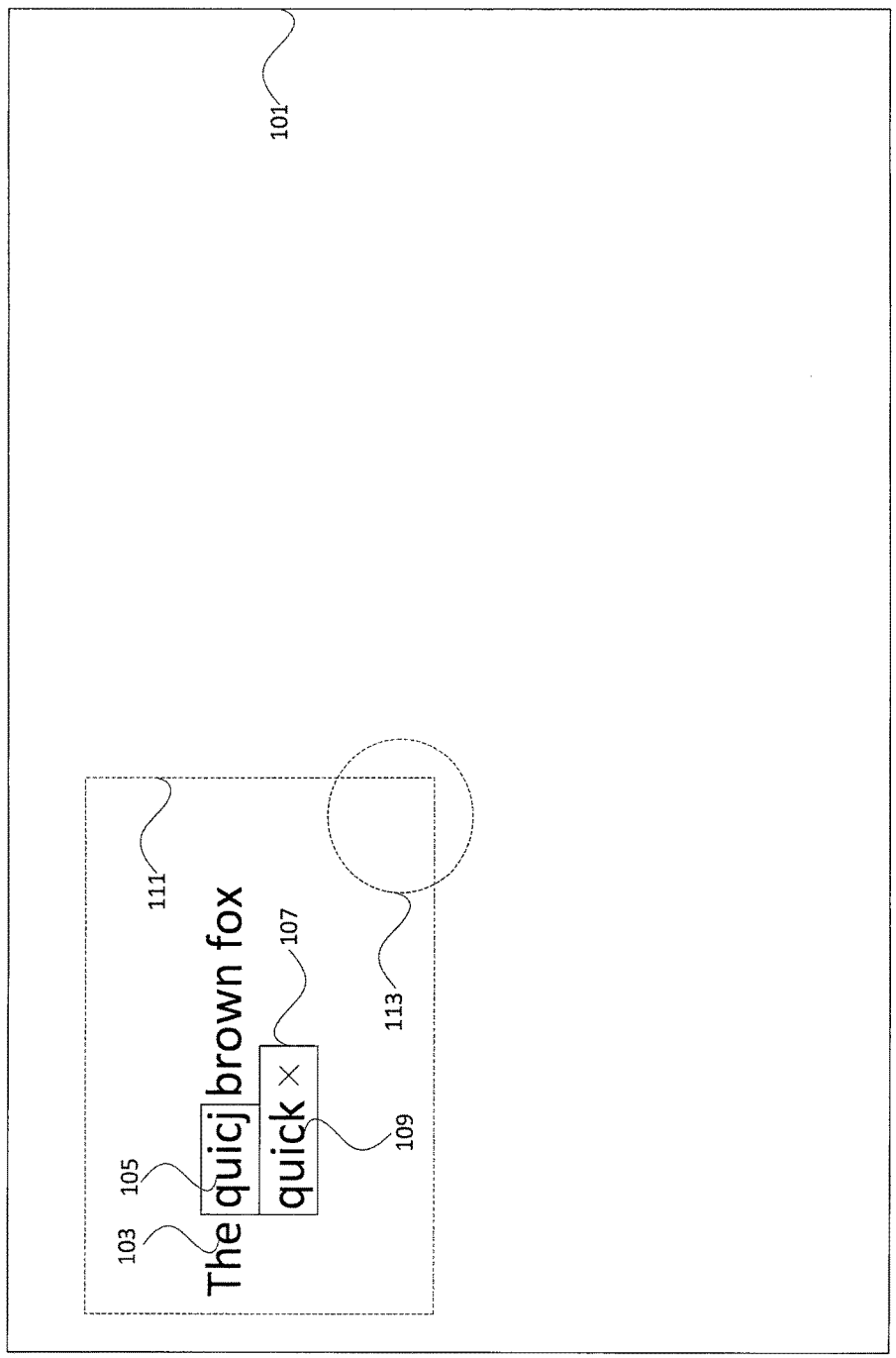
FIG. 1B illustrates a gaze region inside a target region associated with a display event according to examples of the disclosure.
Figure 1C:
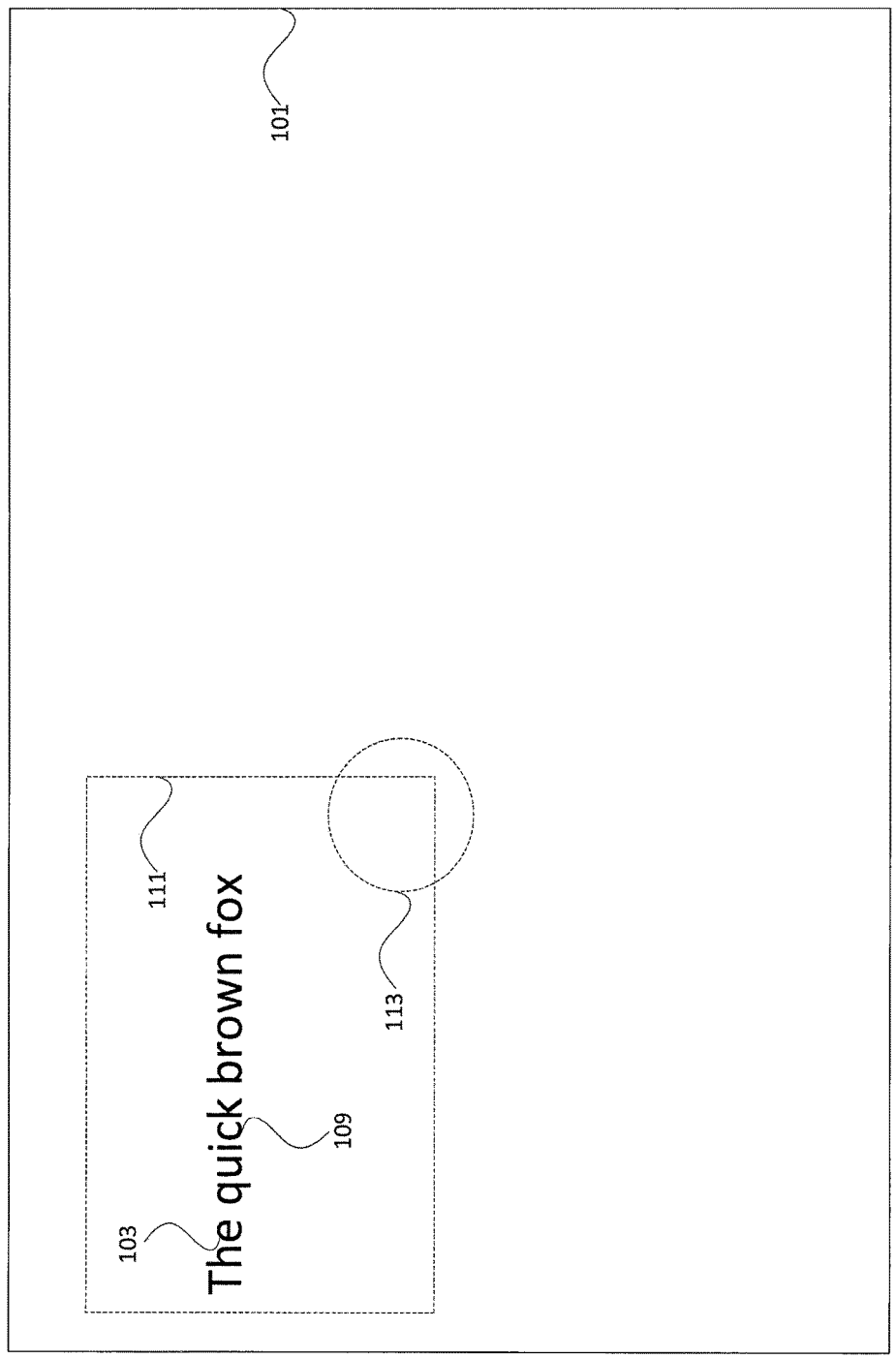
FIG. 1C illustrates a display after execution of a delayed display event according to examples of the disclosure.

FIGS. 1A-C illustrate delaying the execution of a display event based on a detected user gaze according to examples of the disclosure. A display 101 can display user interface objects such as typed words "The" 103 and "quicj" 105, an autocorrect indicator 107, and a corrected word "quick" 109. An autocorrect algorithm can cause the typed word "quicj" to be replaced with the corrected word "quick". Based on this replacement, a display event can be generated that, when executed, would display the corrected word "quick" in place of the typed word "quicj". In some examples, the generation of an event can include storing information and parameters of the event, and can be a separate process from the execution of a previously-generated event. As the user continues to type, the previously-generated display event can be executed: the autocorrect indicator 107 can disappear, and the corrected word 109 can replace the incorrect word 105.

In some examples, gaze information can be obtained from a gaze detection device, and the execution of the display event can be delayed based on the gaze information. For example, gaze information can include a gaze region 113 on the display 101. The gaze region 113 can indicate a location on the display where a user is looking. Additionally, the gaze region 113 can indicate that a user is not looking at the display, and instead indicate that the user is looking at, for example, a keyboard or a physical document, among other possibilities. In some examples, the execution of the display event can be delayed until gaze information indicates that a user is looking at the display. In some examples, a gaze region may be a single position. A gaze region may be represented by a single coordinate on the display, a coordinate and radius, or coordinate vertices of a polygon, among other possibilities. Although gaze region 113 is illustrated as an oval or circular in the figures, the gaze region may not be displayed on the display 101 according to some examples.

In some examples, the display event can be associated with a target region 111 of the display, and the execution of the display event can be delayed until the gaze region 113 falls within the associated target region 111. In some examples, the associated target region can include the portion of the display where the display event will take place. For example, target region 111 includes the portion of the display where the corrected word "quick" would be displayed in place of the typed word "quicj". In some examples, the associated target region may include the entire display. In such an example, a display event can be delayed until gaze information indicates that a user is looking at the display. In some examples, it can be determined that a gaze region falls within a target region if the gaze region merely overlaps with the target region. In some examples, a target region may be a single position. A target region may be represented by a single coordinate on the display, a coordinate and radius, or coordinate vertices of a polygon, among other possibilities. Although the target region 111 is illustrated as a rectangle in the figures, the target region may not be displayed on the display 101 according to some examples.

FIG. 1A illustrates a gaze region 113 outside a target region 111 associated with a display event according to examples of the disclosure. After generation of a display event to display the corrected word "quick" in place of the typed word "quicj", it can be determined that the gaze region 113 is outside the target region 111 associated with the display event. Based on this determination, the execution of the display event can be delayed.

FIG. 1B illustrates a gaze region 113 partially inside a target region 111 associated with a display event according to examples of the disclosure. After delaying the execution of the display event, additional gaze information can be obtained from a gaze detection device. The additional gaze information can include a gaze region 113 that falls inside or otherwise overlaps the target region 111. Based on a determination that the gaze region 113 falls inside or overlaps the target region 111, the display event can be executed.

FIG. 1C illustrates a display after execution of a delayed display event according to examples of the disclosure. After some period of time after the gaze region 113 was determined to be inside the target region 111, the autocorrect indicator can appear on the display for another period of time (not shown in FIG. 1C). After yet another period of time, the typed word "quicj" 105 and the autocorrect indicator 107 can no longer be displayed, and the corrected word "quick" 109 can now be displayed where the typed word "quicj" had been previously displayed, as illustrated in FIG. 1C. Because the execution of this display event was delayed until the gaze region 113 was inside the target region 111 associated with the display event, it may be more likely that the user actually saw the execution of the display event on the display. If multiple autocorrect indicators were delayed, the indicators can be displayed together or in sequence once the gaze region overlaps the target region.

Figure 2A:
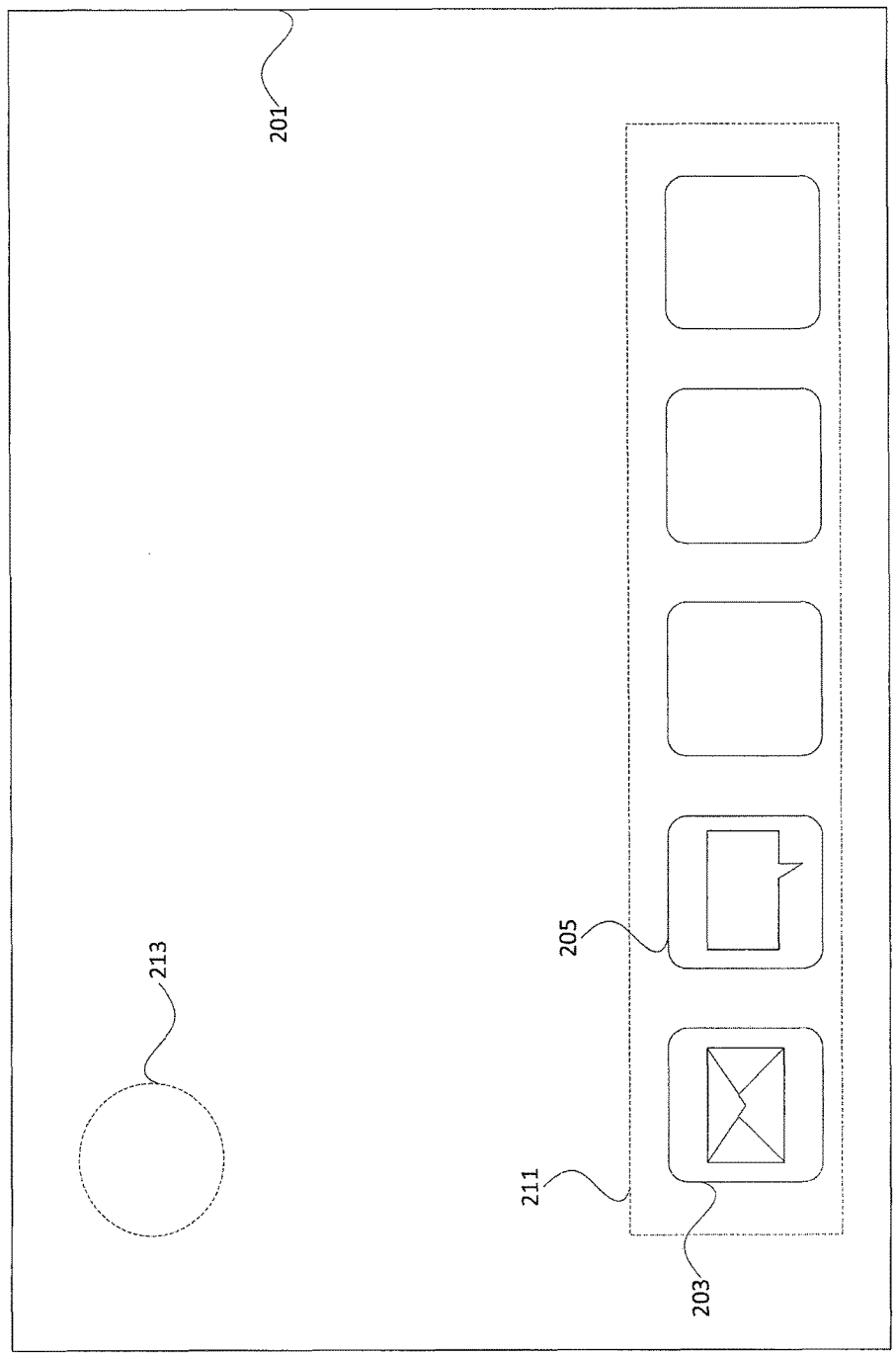
FIG. 2A illustrates a gaze region outside a target region associated with a display event according to examples of the disclosure.
Figure 2B:
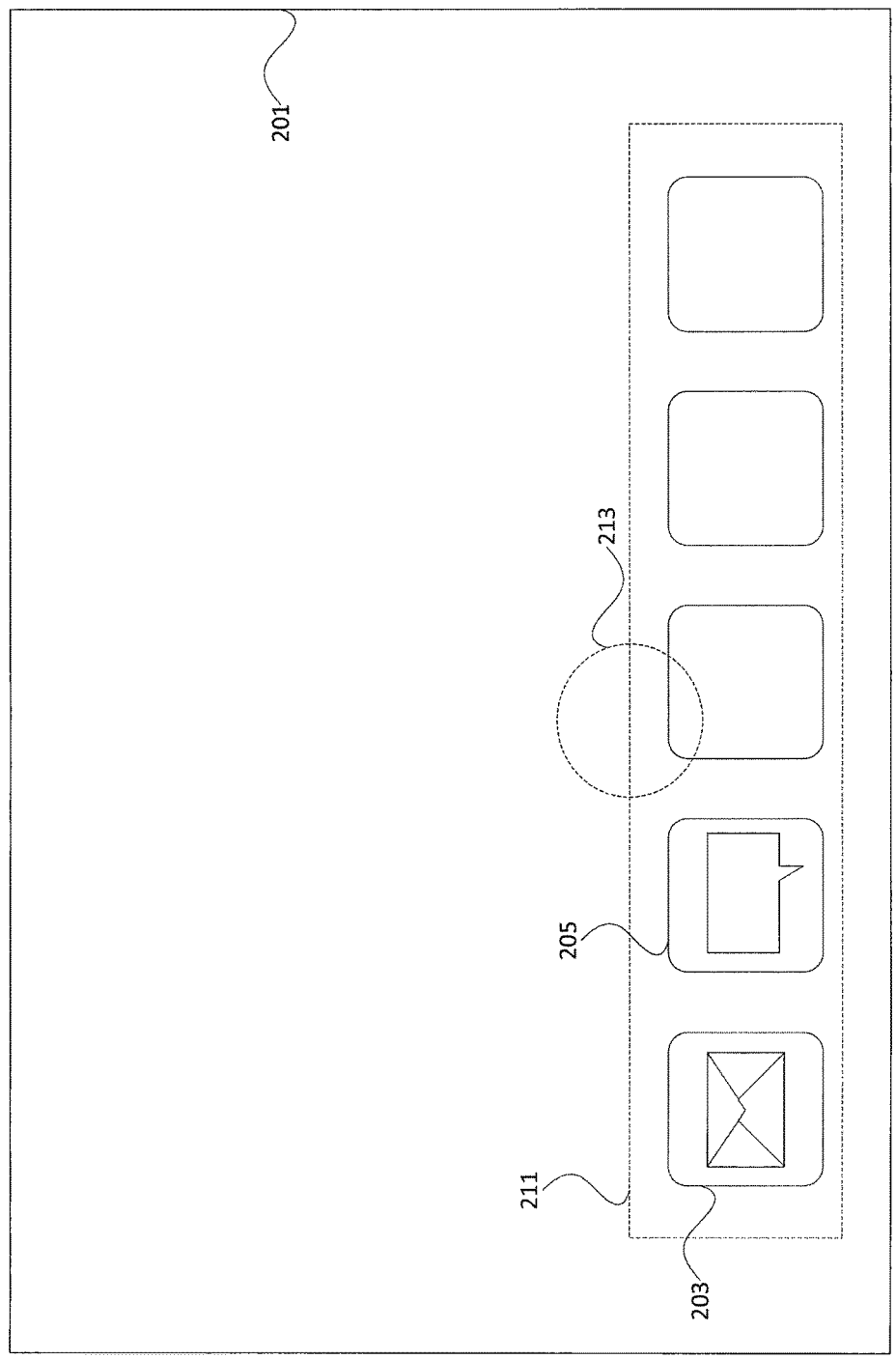
FIG. 2B illustrates a gaze region inside a target region associated with a display event according to examples of the disclosure.
Figure 2C:
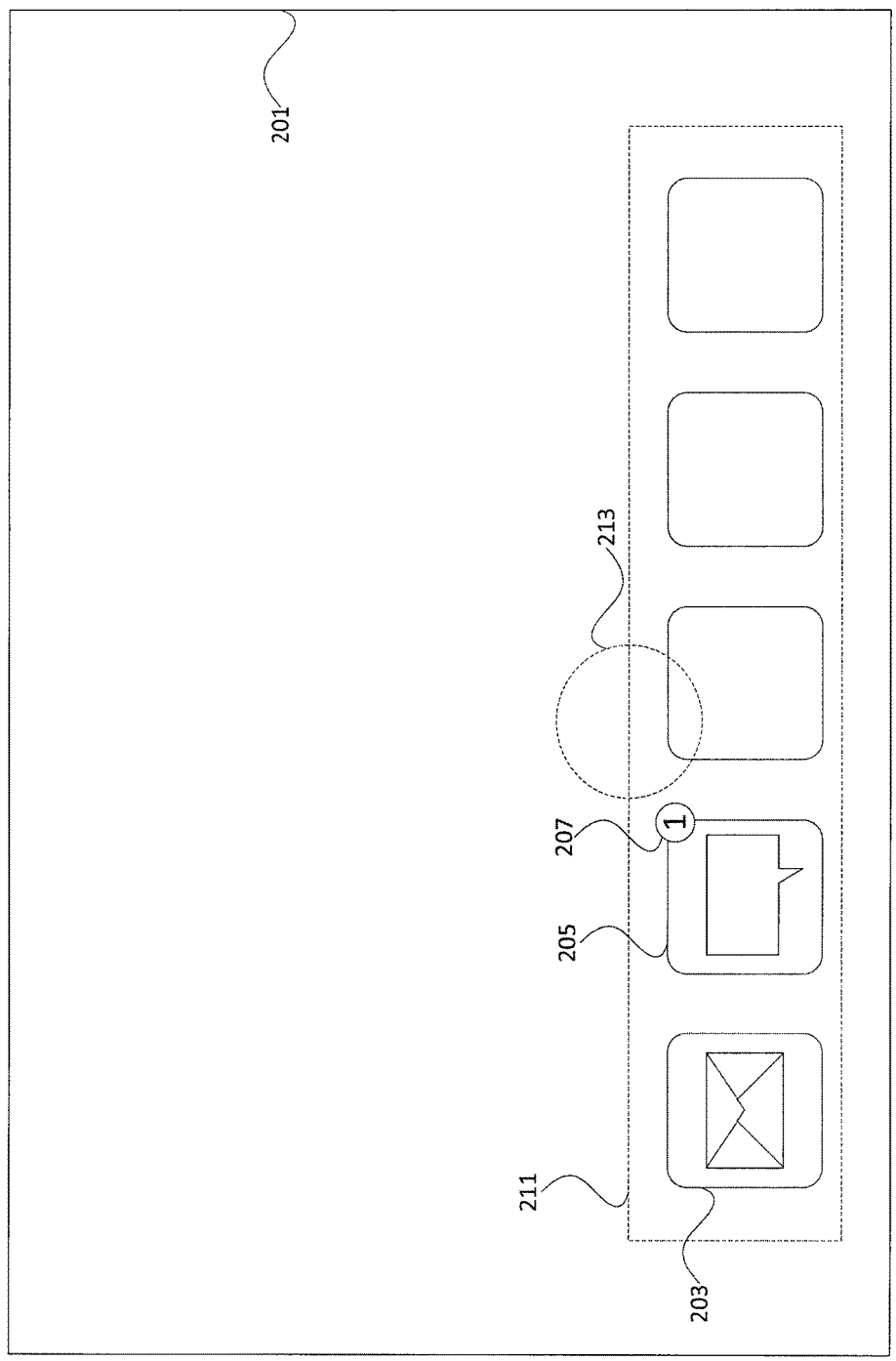
FIG. 2C illustrates a display after execution of a delayed display event according to examples of the disclosure.

FIGS. 2A-C illustrate delaying the execution of a display event based on a detected user gaze according to examples of the disclosure. A display 201 can display user interface objects such as a mail icon 203 and a message icon 205. If a new message is received, a display event can be generated that, when executed, would display a badge on message icon 205 indicating that there is one new message. As discussed above, in some examples, the generation of an event can include storing information and parameters of the event, and can be a separate process from the execution of a previously-generated event.

Gaze information can be obtained from a gaze detection device, and the execution of the display event can be delayed based on the gaze information. For example, gaze information can include a gaze region 213 on the display 201.

In some examples, the display event can be associated with a target region 211 of the display, and the execution of the display event can be delayed until the gaze region 213 falls within the associated target region 211. For example, the display event can be associated with the target region 211 encompassing the row of icons including the mail icon 203 and the message icon 205. Other examples may include different associated target regions.

FIG. 2A illustrates a gaze region 213 outside a target region 211 associated with a display event according to examples of the disclosure. After generation of a display event to display a badge on message icon 205 indicating that there is one new message, it can be determined that the gaze region 213 is outside the target region 211 associated with the display event. Based on this determination, the execution of the display event can be delayed.

FIG. 2B illustrates a gaze region 213 inside a target region 211 associated with a display event according to examples of the disclosure. After delaying the execution of the display event, additional gaze information can be obtained from a gaze detection device. The additional gaze information can include a gaze region 213 that falls inside the target region 211. Based on a determination that the gaze region 213 falls inside the target region 211, the display event can be executed.

FIG. 2C illustrates a display after execution of a delayed display event according to examples of the disclosure. A badge 207 indicating that there is one new message can be displayed on message icon 205. Because the execution of this display event was delayed until the gaze region 213 was inside the target region 211 associated with the display event, it can be more likely that the user actually saw the execution of the display event on the display.

Examples of the disclosure can be applied to events other than those described above, such as displayed badges or pop-up notifications for voice mail message, news alerts, software or application updates, and the like. In other examples, the display can remain dark or dimmed until the gaze region overlaps the display. Non-display events can include sending data from one module to another, modifying or processing stored data, initiating or ending a process, and the like.

Figure 3:
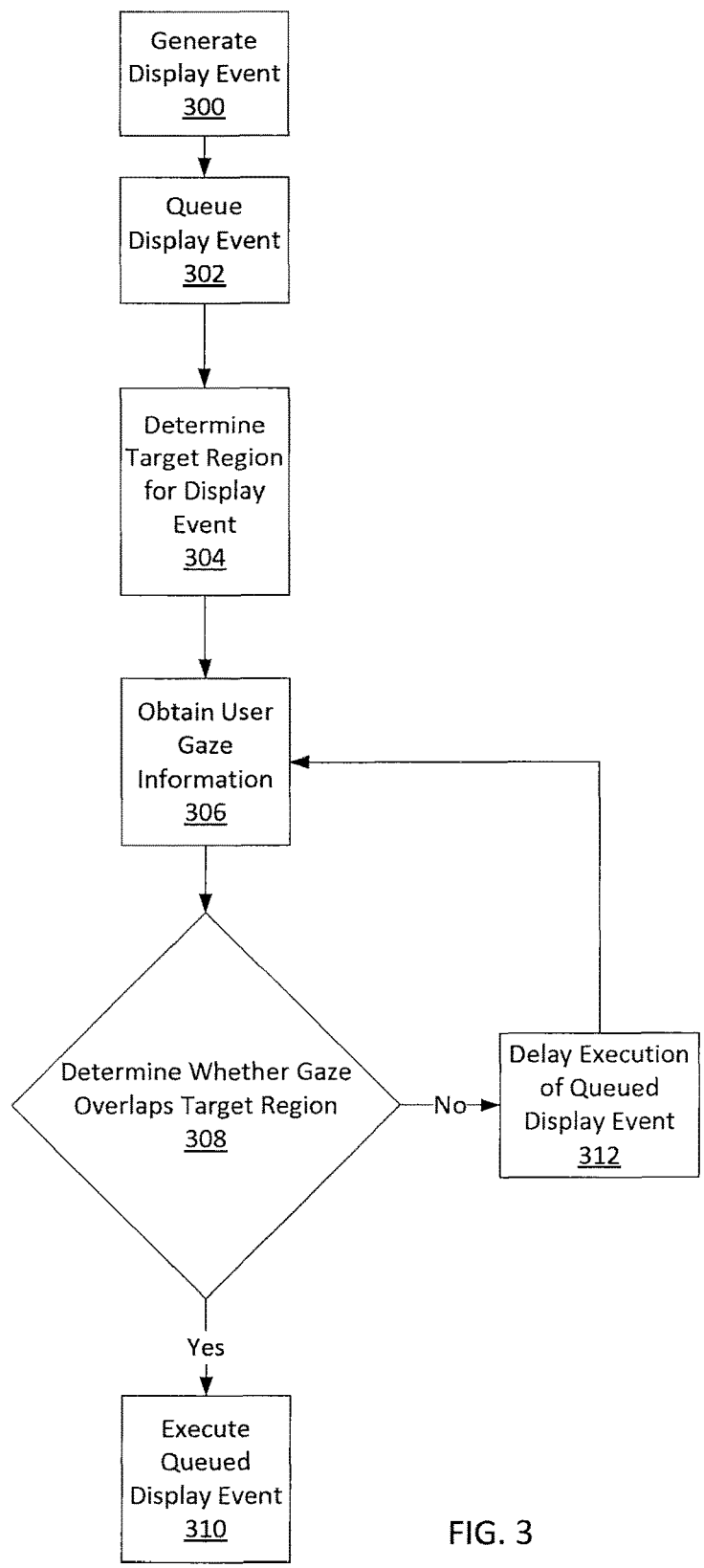
FIG. 3 illustrates an exemplary method of delaying execution of a display event based on gaze information according to examples of the disclosure.

FIG. 3 illustrates an exemplary method of delaying execution of a display event based on gaze information according to some examples of the disclosure. Although FIG. 3 and accompanying text refer specifically to display events, examples can also apply to events in general, including those not related to a display.

First, a display event can be generated (step 300). In some examples, the generation of an event can include storing information and parameters of the event, and can be a separate process from the execution of a previously-generated event. The display event can be queued for execution (step 302). Queuing an event for execution may include adding the event to an event queue. In some examples, queuing an event for execution may include merely marking the event for execution, or providing a time for execution of the event. A target region associated with the display event may be determined (step 304). Determining the target region may include obtaining a definition of the target region associated with the display event. In some examples, determining the target region may include obtaining a position or bounding box associated with the display event.

User gaze information may be obtained (step 306). User gaze information may include a gaze region, as discussed above. User gaze information may be obtained from a gaze detection device, such as a camera or other optical device. Obtaining user gaze information may include processing an image obtained from an optical device, according to some examples. Some existing gaze detection techniques can include transmitting infrared waves to an individual's retina and sensing reflected infrared waves with a camera to determine the location of the individual's pupil and lens. Infrared light can be reflected from a user's face but absorbed by a user's pupils. Therefore, the points of light absorption can be detected as eyes. Alternatively, the infrared data can be inverted, and then the pupils will stand out as very bright circles. The eye position can be used to determine gaze information, including a gaze region on a display.

It can be determined whether the user gaze overlaps the target region associated with the display event (step 308). This determination can be based on a comparison of the target region and the gaze region to determine any overlap. In some examples, the area of the overlapping region can be compared to a threshold area to determine whether the user gaze overlaps the target region. This overlap determination can be made in a variety of other ways, such as whether the gaze region is entirely inside the target region, whether the gaze region is partially inside the target region (e.g., some percentage of the gaze region is inside the target region), whether a centroid of the gaze region is inside the target region, etc.

If the gaze is determined to overlap the target region, the queued display event can be executed (step 310). Executing the display event can include changing the user interface of the display according to the display event. Changing the user interface can include adding and/or removing one or more user interface objects from the display. Additionally, changing the user interface can include moving or otherwise animating one or more user interface objects. In some examples, executing the display event can include removing the display event from an event queue.

If the gaze is determined not to overlap the target region, the execution of the queued display event can be delayed (step 312). Delaying the execution of the display event can include moving the display event further back in an event queue. In some examples, delaying the execution of the display event can include queuing the display event for later execution. In some examples, delaying the execution of the display event can include providing a later time for execution. In some examples, delaying execution of the display event can include merely not executing the display event when it comes up for execution (e.g., when it is at the front of the event queue). After delaying the execution of the queued display event, additional user gaze information can be obtained (step 306) and it can be determined whether the gaze overlaps the target region (step 308) to see whether the execution of the display event should be delayed further.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 4:
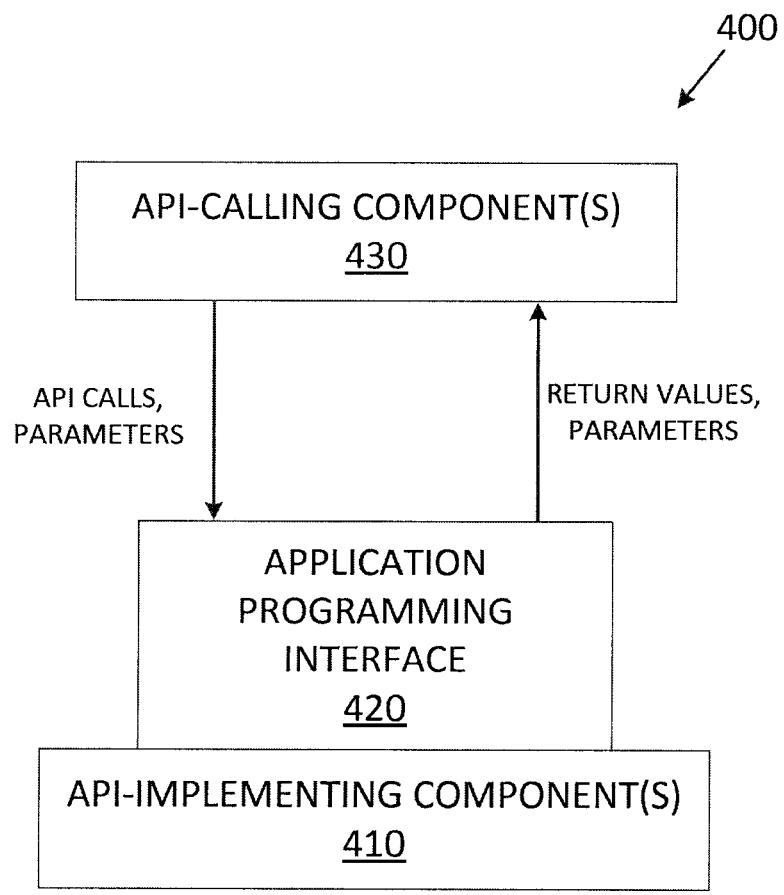
FIG. 4 is a block diagram illustrating an exemplary API architecture, which may be used in some examples of the disclosure.

FIG. 4 is a block diagram illustrating an exemplary API architecture, which may be used in some examples of the disclosure. As shown in FIG. 4, the API architecture 400 includes the API-implementing component 410 (e.g., an operating system, a library, a device driver, an API, an application program, software or other module) that implements the API 420. The API 420 specifies one or more functions, methods, classes, objects, protocols, data structures, formats and/or other features of the API-implementing component that may be used by the API-calling component 430. The API 420 can specify at least one calling convention that specifies how a function in the API-implementing component receives parameters from the API-calling component and how the function returns a result to the API-calling component. The API-calling component 430 (e.g., an operating system, a library, a device driver, an API, an application program, software or other module), makes API calls through the API 420 to access and use the features of the API-implementing component 410 that are specified by the API 420. The API-implementing component 410 may return a value through the API 420 to the API-calling component 430 in response to an API call.

It will be appreciated that the API-implementing component 410 may include additional functions, methods, classes, data structures, and/or other features that are not specified through the API 420 and are not available to the API-calling component 430. It should be understood that the API-calling component 430 may be on the same system as the API-implementing component 410 or may be located remotely and accesses the API-implementing component 410 using the API 420 over a network. While FIG. 4 illustrates a single API-calling component 430 interacting with the API 420, it should be understood that other API-calling components, which may be written in different languages (or the same language) than the API-calling component 430, may use the API 420.

The API-implementing component 410, the API 420, and the API-calling component 430 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 5:
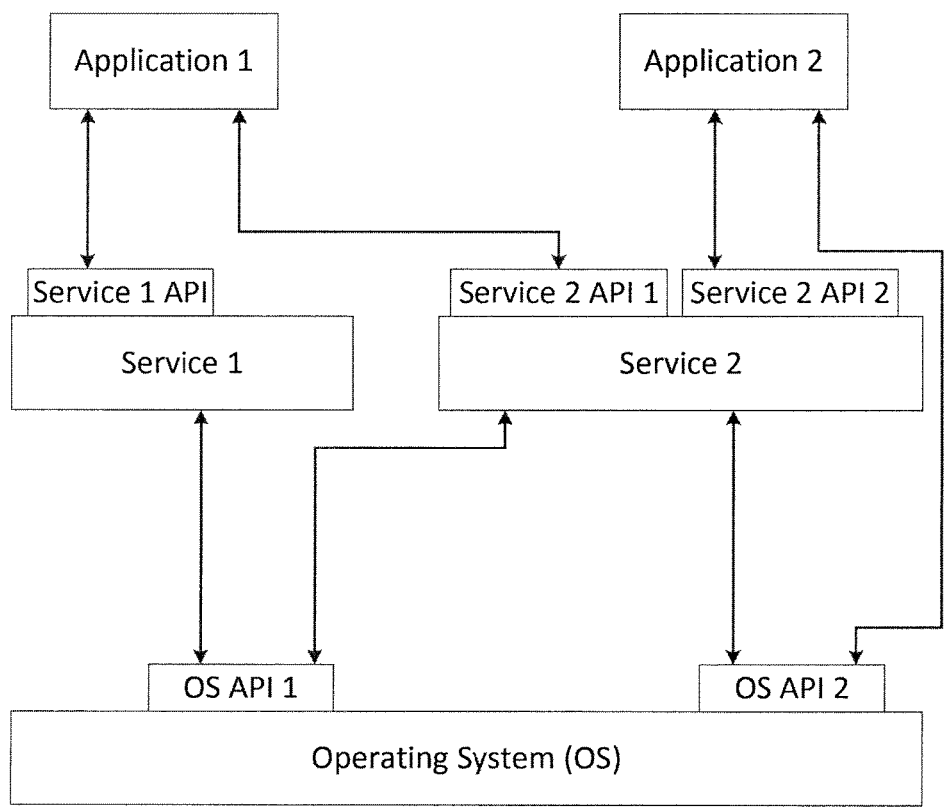
FIG. 5 illustrates an exemplary software stack of an API according to examples of the disclosure.

In the exemplary software stack shown in FIG. 5, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 6:
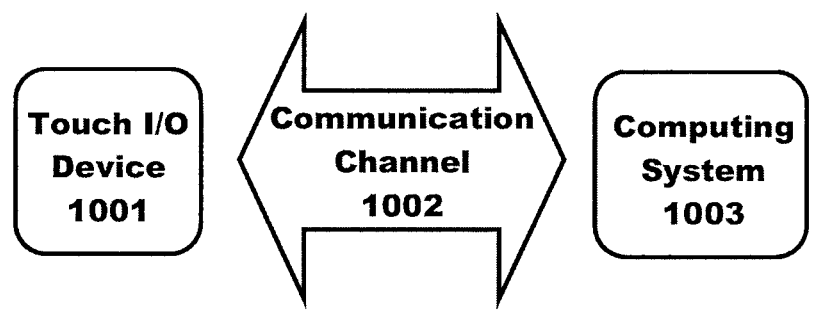
FIG. 6 is a block diagram illustrating exemplary interactions between the touch screen and the other components of the device according to examples of the disclosure.

FIG. 6 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensitive panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1001 embodied as a touch screen may include a transparent and/or semitransparent touch sensitive panel partially or wholly positioned over at least a portion of a display, such as the display illustrated in FIGS. 1A-2C. According to this example, touch I/O device 1001 functions to display graphical data transmitted from computing system 1003 (and/or another source) and also functions to receive user input. In other examples, touch I/O device 1001 may be embodied as an integrated touch screen where touch sensitive components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof. Exemplary gestures include the single contact and two contact scaling gestures discussed above in view of FIGS. 1-6.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 7:
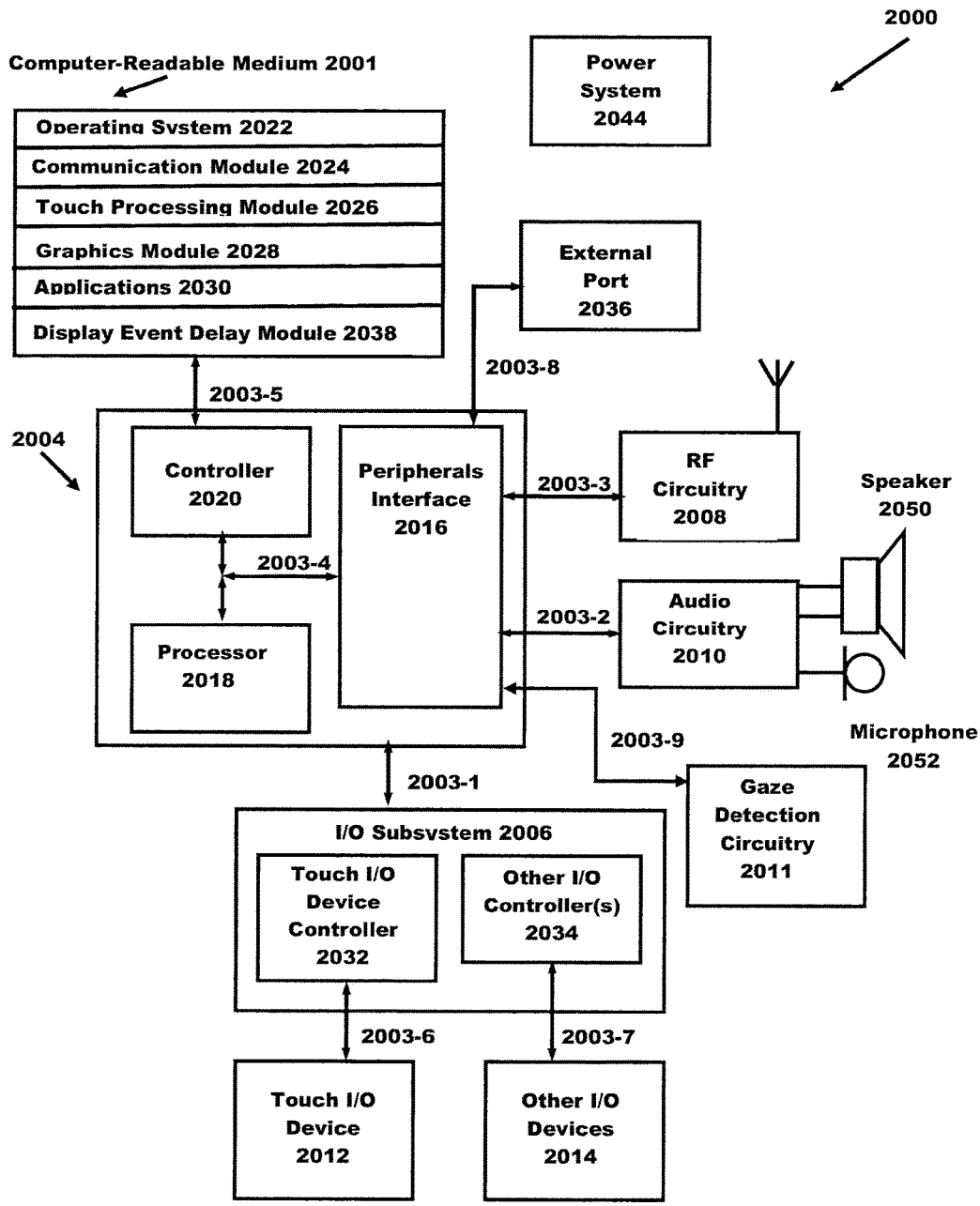
FIG. 7 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 7 is a block diagram of one example of system 2000 that generally includes one or more computer-readable mediums 2001, processing system 2004, I/O subsystem 2006, radio frequency (RF) circuitry 2008, audio circuitry 2010, and gaze detection circuitry 2011. These components may be coupled by one or more communication buses or signal lines 2003.

It should be apparent that the architecture shown in FIG. 7 is only one example architecture of system 2000, and that system 2000 could have more or fewer components than shown, or a different configuration of components. The various components shown in FIG. 7 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown). Gaze detection circuitry 2011 can be coupled to an optical device, such as a camera, for obtaining information regarding the gaze of a user. In some examples, gaze detection circuitry can process images acquired by an optical device to determine gaze information.

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, one or more applications (or set of instructions) 2030, and display event delay module (or set of instructions) 2038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensitive display (e.g., touch screen), graphics module 2028 includes components for rendering, displaying, and animating objects on the touch sensitive display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

System 2000 may further include display event delay module 2038 for performing the method/functions as described herein in connection with FIG. 3. Display event delay module 2038 may at least function to delay the execution of display events based on gaze information obtained from gaze detection circuitry 2011. Module 2038 may be embodied as hardware, software, firmware, or any combination thereof. Although module 2038 is shown to reside within medium 2001, all or portions of module 2038 may be embodied within other components within system 2000 or may be wholly embodied as a separate component within system 2000.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch-sensitive surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in allowing users to perform scaling operations while holding and operating a device with only one hand, and have at least the technical effect of creating a second, virtual touch input based on only a single actual touch input.

In some examples, a computer-implemented method is disclosed. The method can include generating a display event; obtaining user gaze information; and delaying the execution of the display event based on the user gaze information. Additionally or alternatively to one or more of the examples disclosed above, the method can further include obtaining additional user gaze information; and executing the display event based on the additional user gaze information. Additionally or alternatively to one or more of the examples disclosed above, executing the display event can include one or more of adding a user interface object to a display, removing a user interface object from a display, and animating a user interface object on a display. Additionally or alternatively to one or more of the examples disclosed above, the user gaze information can include a gaze region on a display, and the method can further include obtaining a target region of the display, the target region being associated with the display event; and determining that the gaze region does not overlap the target region; wherein delaying the execution of the display event based on the user gaze information can include delaying the execution of the display event based on the determination that the gaze region does not overlap the target region. Additionally or alternatively to one or more of the examples disclosed above, the method can further include determining an overlapping area based on the gaze region and the target region; comparing the overlapping area to a threshold area; and determining that the overlapping area is less than the threshold area; wherein determining that the gaze region does not overlap the target region can be based on the determination that the overlapping area is less than the threshold area. Additionally or alternatively to one or more of the examples disclosed above, obtaining the target region can include obtaining a bounding box of the display event. Additionally or alternatively to one or more of the examples disclosed above, the target region can include the entire display. Additionally or alternatively to one or more of the examples disclosed above, the method can further include queuing the display event on an event queue; wherein delaying the execution of the display event can include queuing the display event further back on the event queue. Additionally or alternatively to one or more of the examples disclosed above, the method can further include obtaining an image from a gaze detection device; and processing the image obtained from the gaze detection device; wherein the user gaze information can be obtained based on the processed image.

In some examples, an electronic device is disclosed. The electronic device can include a display; a processor to execute instructions; and a memory coupled with the processor to store instructions, which when executed by the processor, cause the processor to perform operations to generate an application programming interface (API) that allows an API-calling component to perform the following operations: generating a display event; obtaining user gaze information; and delaying the execution of the display event based on the user gaze information. Additionally or alternatively to one or more of the examples disclosed above, the operations can further include obtaining additional user gaze information; and executing the display event based on the additional user gaze information. Additionally or alternatively to one or more of the examples disclosed above, executing the display event can include one or more of adding a user interface object to the display, removing a user interface object from the display, and animating a user interface object on the display. Additionally or alternatively to one or more of the examples disclosed above, the user gaze information can include a gaze region on the display, and the operations can further include obtaining a target region of the display, the target region being associated with the display event; and determining that the gaze region does not overlap the target region; wherein delaying the execution of the display event based on the user gaze information can include delaying the execution of the display event based on the determination that the gaze region does not overlap the target region. Additionally or alternatively to one or more of the examples disclosed above, the operations can further include determining an overlapping area based on the gaze region and the target region; comparing the overlapping area to a threshold area; and determining that the overlapping area is less than the threshold area; wherein determining that the gaze region does not overlap the target region can be based on the determination that the overlapping area is less than the threshold area. Additionally or alternatively to one or more of the examples disclosed above, obtaining the target region can include obtaining a bounding box of the display event. Additionally or alternatively to one or more of the examples disclosed above, the target region can include the entire display. Additionally or alternatively to one or more of the examples disclosed above, the operations can further include queuing the display event on an event queue; wherein delaying the execution of the display event can include queuing the display event further back on the event queue. Additionally or alternatively to one or more of the examples disclosed above, the operations can further include obtaining an image from a gaze detection device; and processing the image obtained from the gaze detection device; wherein the user gaze information can be obtained based on the processed image.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method comprising:
    at an electronic device with a display and a gaze detection device:
    displaying, in a target region of the display, one or more words entered by a user of the electronic device;
    while displaying the one or more words, receiving a sequence of character inputs;
    in response to receiving the sequence of character inputs, displaying, in the target region, a sequence of user-input characters that corresponds to the sequence of character inputs, wherein the sequence of user-input characters has an associated sequence of autocorrect characters that is different from the sequence of user-input characters; and
    after displaying the sequence of user-input characters:
        determining whether a gaze region of the user of the electronic device, obtained from the gaze detection device, and the target region of the display overlap;
        in accordance with a determination that the gaze region and the target region do overlap, replacing, on the display, the sequence of user-input characters with the sequence of autocorrect characters; and
        in accordance with a determination that the gaze region and the target region do not overlap, delaying replacing the sequence of user-input characters with the sequence of autocorrect characters.

2. The method of claim 1, further comprising:
    after delaying replacing the sequence of user-input characters with the sequence of autocorrect characters, determining that the gaze region of the user of the electronic device overlaps with the target region of the display; and
    in response to determining that the gaze region overlaps with the target region, replacing, on the display, the sequence of user-input characters with the sequence of autocorrect characters.

3. The method of claim 2, further comprising:
    after delaying replacing the sequence of user-input characters with the sequence of autocorrect characters:
    receiving a second sequence of character inputs; and
    in response to receiving the second sequence of character inputs, displaying, on the display, a second sequence of user-input characters that corresponds to the second sequence of character inputs,
    wherein determining that the gaze region overlaps with the target region, and replacing, on the display, the sequence of user-input characters with the sequence of autocorrect characters, occur while displaying, on the display, the second sequence of user-input characters.

4. The method of claim 1, further comprising:
    concurrently displaying the sequence of user-input characters with an autocorrect indicator that includes the sequence of autocorrect characters,
    wherein:
        replacing, on the display, the sequence of user-input characters with the sequence of autocorrect characters includes ceasing display of the autocorrect indicator, and
        delaying replacing the sequence of user-input characters with the sequence of autocorrect characters includes maintaining display of the autocorrect indicator.

5. The method of claim 1, further comprising:
    while displaying the sequence of user-input characters:
    receiving a second sequence of character inputs; and
    in response to receiving the second sequence of character inputs, displaying, in the target region, a second sequence of user-input characters that corresponds to the second sequence of character inputs, wherein the second sequence of user-input characters has an associated second sequence of autocorrect characters that is different from the second sequence of user-input characters; and
    while displaying the sequence of user-input characters and the second sequence of user-input characters:
        determining whether the gaze region of the user of the electronic device, obtained from the gaze detection device, and the target region of the display overlap;
        in accordance with a determination that the gaze region and the target region do overlap, replacing, on the display:
            the sequence of user-input characters with the sequence of autocorrect characters; and
            the second sequence of user-input characters with the second sequence of autocorrect characters; and
        in accordance with a determination that the gaze region and the target region do not overlap, delaying replacing:
            the sequence of user-input characters with the sequence of autocorrect characters; and
            the second sequence of user-input characters with the second sequence of autocorrect characters.

6. The method of claim 5, further comprising:
    after delaying replacing the sequence of user-input characters with the sequence of autocorrect characters and the second sequence of user-input characters with the second sequence of autocorrect characters, determining that the gaze region of the user of the electronic device overlaps with the target region of the display; and
    in response to determining that the gaze region overlaps with the target region, replacing, on the display:
        the sequence of user-input characters with the sequence of autocorrect characters; and
        the second sequence of user-input characters with the second sequence of autocorrect characters.

7. The method of claim 1, wherein the target region includes an entirety of the display.

8. A non-transitory computer readable storage medium having stored therein instructions, which when executed by an electronic device with a display and a gaze detection device, cause the electronic device to perform a method comprising:
    displaying, in a target region of the display, one or more words entered by a user of the electronic device;
    while displaying the one or more words, receiving a sequence of character inputs;
    in response to receiving the sequence of character inputs, displaying, in the target region, a sequence of user-input characters that corresponds to the sequence of character inputs, wherein the sequence of user-input characters has an associated sequence of autocorrect characters that is different from the sequence of user-input characters; and after displaying the sequence of user-input characters:
  determining whether a gaze region of the user of the electronic device, obtained from the gaze detection device, and the target region of the display overlap;
  in accordance with a determination that the gaze region and the target region do overlap, replacing, on the display, the sequence of user-input characters with the sequence of autocorrect characters; and
  in accordance with a determination that the gaze region and the target region do not overlap, delaying replacing the sequence of user-input characters with the sequence of autocorrect characters.

9. The non-transitory computer readable storage medium of claim 8, the method further comprising:
  after delaying replacing the sequence of user-input characters with the sequence of autocorrect characters, determining that the gaze region of the user of the electronic device overlaps with the target region of the display; and
  in response to determining that the gaze region overlaps with the target region, replacing, on the display, the sequence of user-input characters with the sequence of autocorrect characters.

10. The non-transitory computer readable storage medium of claim 9, the method further comprising:
  after delaying replacing the sequence of user-input characters with the sequence of autocorrect characters:
    receiving a second sequence of character inputs; and
    in response to receiving the second sequence of character inputs, displaying, on the display, a second sequence of user-input characters that corresponds to the second sequence of character inputs,
  wherein determining that the gaze region overlaps with the target region, and replacing, on the display, the sequence of user-input characters with the sequence of autocorrect characters, occur while displaying, on the display, the second sequence of user-input characters.

11. The non-transitory computer readable storage medium of claim 8, the method further comprising:
  concurrently displaying the sequence of user-input characters with an autocorrect indicator that includes the sequence of autocorrect characters,
  wherein:
    replacing, on the display, the sequence of user-input characters with the sequence of autocorrect characters includes ceasing display of the autocorrect indicator, and
    delaying replacing the sequence of user-input characters with the sequence of autocorrect characters includes maintaining display of the autocorrect indicator.

12. The non-transitory computer readable storage medium of claim 8, the method further comprising:
  while displaying the sequence of user-input characters:
    receiving a second sequence of character inputs; and
    in response to receiving the second sequence of character inputs, displaying, in the target region, a second sequence of user-input characters that corresponds to the second sequence of character inputs, wherein the second sequence of user-input characters has an associated second sequence of autocorrect characters that is different from the second sequence of user-input characters; and while displaying the sequence of user-input characters and the second sequence of user-input characters:
    determining whether the gaze region of the user of the electronic device, obtained from the gaze detection device, and the target region of the display overlap;
    in accordance with a determination that the gaze region and the target region do overlap, replacing, on the display:
      the sequence of user-input characters with the sequence of autocorrect characters; and
      the second sequence of user-input characters with the second sequence of autocorrect characters; and
    in accordance with a determination that the gaze region and the target region do not overlap, delaying replacing:
      the sequence of user-input characters with the sequence of autocorrect characters; and
      the second sequence of user-input characters with the second sequence of autocorrect characters.

13. The non-transitory computer readable storage medium of claim 12, the method further comprising:
  after delaying replacing the sequence of user-input characters with the sequence of autocorrect characters and the second sequence of user-input characters with the second sequence of autocorrect characters, determining that the gaze region of the user of the electronic device overlaps with the target region of the display; and
  in response to determining that the gaze region overlaps with the target region, replacing, on the display:
    the sequence of user-input characters with the sequence of autocorrect characters; and
    the second sequence of user-input characters with the second sequence of autocorrect characters.

14. The non-transitory computer readable storage medium of claim 8, wherein the target region includes an entirety of the display.

15. An electronic device, comprising:
  a display;
  a gaze detection device;
  a memory configured to store instructions; and
  a processor coupled to the memory and configured to execute the instructions and:
    display, in a target region of the display, one or more words entered by a user of the electronic device;
    while displaying the one or more words, receive a sequence of character inputs;
    in response to receiving the sequence of character inputs, display, in the target region, a sequence of user-input characters that corresponds to the sequence of character inputs, wherein the sequence of user-input characters has an associated sequence of autocorrect characters that is different from the sequence of user-input characters; and
    after displaying the sequence of user-input characters:
      determine whether a gaze region of the user of the electronic device, obtained from the gaze detection device, and the target region of the display overlap;
      in accordance with a determination that the gaze region and the target region do overlap, replace, on the display, the sequence of user-input characters with the sequence of autocorrect characters; and
      in accordance with a determination that the gaze region and the target region do not overlap, delay replacing the sequence of user-input characters with the sequence of autocorrect characters.

16. The electronic device of claim 15, the processor further configured to:
  after delaying replacing the sequence of user-input characters with the sequence of autocorrect characters, determine that the gaze region of the user of the electronic device overlaps with the target region of the display; and
  in response to determining that the gaze region overlaps with the target region, replace, on the display, the sequence of user-input characters with the sequence of autocorrect characters.

17. The electronic device of claim 16, the processor further configured to:
  after delaying replacing the sequence of user-input characters with the sequence of autocorrect characters:
    receive a second sequence of character inputs; and
    in response to receiving the second sequence of character inputs, display, on the display, a second sequence of user-input characters that corresponds to the second sequence of character inputs,
  wherein determining that the gaze region overlaps with the target region, and replacing, on the display, the sequence of user-input characters with the sequence of autocorrect characters, occur while displaying, on the display, the second sequence of user-input characters.

18. The electronic device of claim 15, the processor further configured to:
  concurrently display the sequence of user-input characters with an autocorrect indicator that includes the sequence of autocorrect characters,
  wherein:
    replacing, on the display, the sequence of user-input characters with the sequence of autocorrect characters includes ceasing display of the autocorrect indicator, and
    delaying replacing the sequence of user-input characters with the sequence of autocorrect characters includes maintaining display of the autocorrect indicator.

19. The electronic device of claim 15, the processor further configured to:
  while displaying the sequence of user-input characters:
    receive a second sequence of character inputs; and
    in response to receiving the second sequence of character inputs, display, in the target region, a second sequence of user-input characters that corresponds to the second sequence of character inputs, wherein the second sequence of user-input characters has an associated second sequence of autocorrect characters that is different from the second sequence of user-input characters; and
  while displaying the sequence of user-input characters and the second sequence of user-input characters:
    determine whether the gaze region of the user of the electronic device, obtained from the gaze detection device, and the target region of the display overlap;
    in accordance with a determination that the gaze region and the target region do overlap, replace, on the display:
      the sequence of user-input characters with the sequence of autocorrect characters; and
      the second sequence of user-input characters with the second sequence of autocorrect characters; and
    in accordance with a determination that the gaze region and the target region do not overlap, delay replacing:
      the sequence of user-input characters with the sequence of autocorrect characters; and
      the second sequence of user-input characters with the second sequence of autocorrect characters.

20. The electronic device of claim 19, the processor further configured to:
  after delaying replacing the sequence of user-input characters with the sequence of autocorrect characters and the second sequence of user-input characters with the second sequence of autocorrect characters, determine that the gaze region of the user of the electronic device overlaps with the target region of the display; and
  in response to determining that the gaze region overlaps with the target region, replace, on the display:
    the sequence of user-input characters with the sequence of autocorrect characters; and
    the second sequence of user-input characters with the second sequence of autocorrect characters.

21. The electronic device of claim 15, wherein the target region includes an entirety of the display.

* * * * *